Jan. 11, 1944. F. WENZEL 2,338,990

METHOD OF PRODUCING TOOLS

Original Filed Sept. 8, 1939

Inventor:
Friedrich Wenzel,
by *[signature]*
Attorney.

Patented Jan. 11, 1944

2,338,990

UNITED STATES PATENT OFFICE 2,338,990

METHOD OF PRODUCING TOOLS

Friedrich Wenzel, Berlin-Siemensstadt, Germany; vested in the Alien Property Custodian Original application September 8, 1939, Serial No. 294,004. Divided and this application August 15, 1941, Serial No. 406,948. In Germany January 1, 1939

11 Claims. (Cl. 76—101)

This invention relates to a new method of producing tools of the class of milling hobs, milling cutters, gear cutters, taps, dies and the like, as disclosed, for example, in the co-pending application, Ser. No. 294,004, filed September 8, 1939, of which the present application is a division.

A brief discussion of certain aspects that must be considered in connection with this method is rendered below so as to support the detailed explanations which are to follow. A milling cutter or milling hob for cutting gears, such as spur gears and the like, may be taken as an example for illustrating these aspects.

Gears of this type, with any given tooth shape and size, and also worm gears, spiral gears and herringbone gears of any width and with different angles of inclination of the teeth with respect to the axis on the one hand and a variety of profiles on the other hand, may be manufactured by milling without the necessity of reclamping the work in position. The gears are cut in such a manner that either the cutter is shifted in parallel relation to the axis of the gear, or the work passes the cutter in axial direction. The cutter and gear may rotate like two gears meshing with each other; for instance, in the case of milling spur gears, the cutter and gear rotate according to the ratio of the number of starts of the cutter to the number of teeth. The cutting edges of the milling hob are machined in such a manner as to produce a smooth surface.

Presuming a properly operating dividing head to be used, the precise form of the tooth produced depends upon the exact form of the milling hob or cutter which must run true and be mounted on the mandrel without clearance. In order to cut teeth with the aid of the cutter so as to meet particularly exacting requirements, the dimensions of the tooth profile, of the pitch of the gear teeth and that of the grooves must correspond as accurately as possible to the calculated value. All cutting teeth must lie exactly on a helical line. Of particular importance is the flank and the smooth surface finish of the individual teeth of the milling cutter. To obtain smooth flanks of tooth during the milling operation the face and the flanks of the cutter must be smooth and free of scratches.

To fulfil these conditions as far as possible the cutters are nowadays manufactured as relief ground cutters in the following manner:

The cutter body is first formed on a turning lathe, furnishing a tubular cylindrical or disklike body with a central bore. Grooves are then milled or cut in the cutter body, which extend in parallel with the axis thereof, leaving material intermediate these grooves for forming the teeth. The flanks of the teeth are formed next by relief cutting or grinding of the individual teeth. A heat treatment is then applied in order to remove stresses in the material, followed by tempering or hardening. As the next operation, the bore of the cutter is ground and lapped, followed by a sharpening of the face of each tooth. In the case of cutters with ground faces the relief grinding is the last operation. It is carried out on special machines, with the aid of double-coned-, hollow conical-, or conical-end grinding wheels.

These grinding wheels are small in size and are liable to be damaged, particularly when manufacturing cutters having a small pitch. They must permit a relief grinding of the individual teeth of the cutter without damaging the next following tooth as this occurs when using larger grinding wheels. The manufacture of these small grinding wheels is expensive, and they are subjected to considerable wear. They are, however, indispensable in the present-day manufacture of high-grade milling hobs. A further disadvantage of the relief ground cutter consists in the fact that during the grinding operation the roughness of the surface of the finish ground teeth of the cutters cannot be removed. The method of fine polishing hardened tools consists in treating the latter with moistened polishing materials, that is to say, in lapping which is employed for the face of the tooth but which could not hitherto be employed for the flanks thereof.

The manufacture of such milling hobs or cutters as practiced in the past thus requires operations which consume considerable time and labor, and necessitate the use of expensive special handling and special tooling equipment. The new method eliminates many of the obvious drawbacks and disadvantages. It contemplates the following steps:

1. The provision of a concentric composite ring structure comprising a ring made of a soft metal, copper or soft iron, for instance, and another ring made of a hard metal, e. g., tool steel attached to the first mentioned ring by welding or soldering or the like. The first mentioned ring of soft metal may be termed the "carrier member" or "carrier ring," and the other ring may be designated as "tool ring."

2. A polygonal member which may be termed the "base member" is driven or pressed into concentric engagement with the carrier ring noted above, forming with the composite rings a uniform, accurately centered structure.

3. This structure is put on a spindle or mandrel, or on another suitable tool, and the profile and flanks of the cutting teeth are cut or ground from and into the material of the tool ring which is made of hard metal.

4. Axial grooves, which may be termed "tension grooves," are then cut or ground into the tool ring to a depth reaching the carrier ring thus producing on the soft carrier ring individual axially or longitudinally extending teeth of hard metal.

5. The profile of the individual teeth segments may then be treated by lapping or the like, to produce a smooth crack-free surface.

6. The resulting structure is put into a suitable device, for example, in a press or die, and wedges or wedge-like members are driven into the tension grooves, exerting a radial pressure for the purpose of deforming the carrier ring radially, that is, pressing the soft material of the carrier ring into the spaces on the polygonal member. This step disposes the individual teeth at an angle determined by the form of the polygon and secures the carrier ring in firm interlocking engagement with the polygon.

7. Finishing operations, such as sharpening, and finally, lapping and smoothing the individual teeth of the tool, may be applied if desired or necessary.

The invention will be better understood from a detailed description rendered below with reference to the drawing. In the drawing, Fig. 1 shows a section through the initial composite ring structure comprising, in this embodiment, a centrally disposed polygonal member, an inner carrier ring disposed on the polygon, and an outer tool ring of hardenable metal attached to the carrier;

Figure 1:
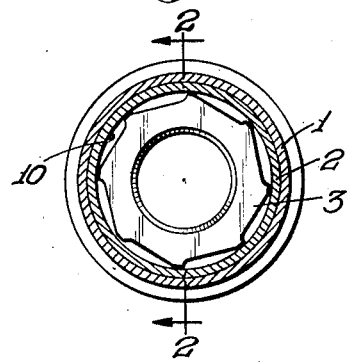

Referring now to the drawing, showing one embodiment of the invention, numeral 1 indicates the ring made of tool steel or hardenable metal. Within this ring is disposed the carrier ring 2 which may be made of copper or soft iron. These rings are joined by hard solder or by welding or the like. The tool ring 1 is suitably tempered or hardened. This constitutes the first step in the process of producing the tool, resulting in a concentric composite double ring, the outside ring 1 of which is hard and the inside or carrier ring 2 of which is made of soft material.

Figure 2:
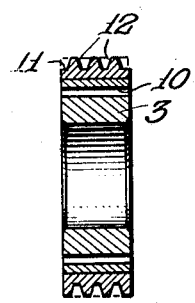
Fig. 2 is a section through the structure shown in Fig. 1, along the line 2—2, also indicating the step of providing the proper profile and the flanks for the cutting teeth of the tool.

The boring 10 of the copper ring (carrier ring) is suitably machined, for example, on a turning lathe, so as to provide the proper inside diameter. A polygonal member 3, shown in Figs. 1 and 2 in plan view and in section, respectively, is driven or pressed into position within the boring 10 of the carrier ring 2 so as to assume the central centered position shown. The body then resulting, in this embodiment, comprises the following parts, listing these parts from the inside to the outside: (1) a steel polygon having a central boring; (2) a soft carrier ring made of copper or soft iron or the like; and (3) a hard outer ring of tempered or hardened tool steel or similar suitable material.

This body is placed on a suitable spindle or mandrel for the purpose of grinding on the outer tool ring the required lateral surfaces 11 and the sides or flanks 12 (Fig. 2) of the profile of the tool. Grinding wheels having relatively large diameters, that is, for example, fast rotating grinding wheels, may readily be used for performing the required operation since a relief grinding is not effected. Such grinding wheels are relatively cheap, and the grinding is carried out with the desired accuracy even in the case of profiles with the smallest module. The resulting surfaces of the profile are accurately centered with respect to the central boring of the tool.

If very smooth surfaces are desired in the tool structures to be produced, for example, if the tool is intended for the manufacture of small gear wheels for precision apparatus, the surfaces may be polished by lapping so as to produce the required surface finish. It may be stated that the smoothness of the surfaces which can be produced according to the present method could not be obtained even approximately by employing previously known processes.

The next step has to do with forming the individual teeth in the cutter. Axial grooves 13 are cut or ground for this purpose in the outer steel or tool ring 1, to form individual hard segments forming the teeth 14 which are thus carried by and disposed on the soft carrier ring 2. The grinding of these grooves is carried radially down to the supporting carrier ring 2 at places corresponding to and radially substantially in line with or near the deepest points of the depressions formed on the periphery of the polygon 3.

If desired, the individual teeth segments may be treated, for example, by lapping, so as to remove all cracks or surface grooves or blemishes. The teeth segments may thus be made microscopically smooth.

The resulting body is then placed into a device designed for exerting radial pressure on the soft carrier ring in the places determined by the tension grooves 13 so as to press the ring radially into engagement with the corresponding depressions in the polygon 3. This operation completes the process except for finishing steps that may be applied, and pitches the teeth radially at an angle as indicated at 7 in Fig. 7.

Figure 3:
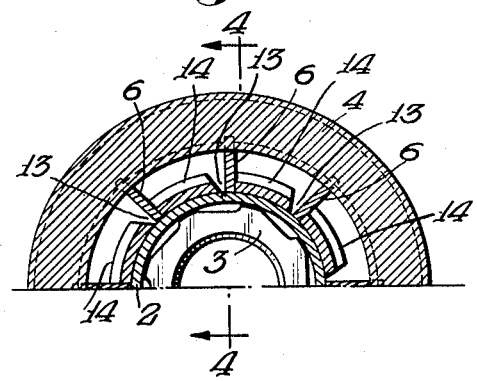
Figs. 3 and 4 represent sections through a device for performing the step of pressing sections of the soft carrier ring into corresponding depressed spaces on the centrally disposed polygonal member.

The device, in the embodiment shown in the drawing, comprises a ring 4 which is gradually drawn in axial direction into a ring 5, for example, by means of a screw spindle or by any other suitable means that may include a sturdy press. Wedges 6 project radially inwardly from the ring 4, as shown in Fig. 3, or are disposed as shown in this figure. These wedges are driven within the tension grooves 13 radially against the soft carrier ring 2, and thus deform and press the ring at the indicated points into the peripheral depressions on the polygon 3.

Figure 5:
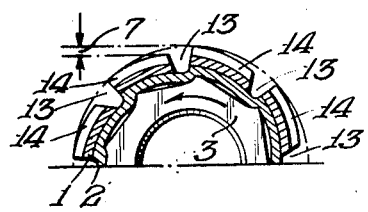
Fig. 5 is a partial section through the finished tool.

The form of the soft carrier ring after this operation and the resulting form and angle of the teeth 14 is apparent from Fig. 5. The material easily withstands the deformation and the proper angle of relief may thus be obtained with an accuracy and certainty that was unobtainable in the past. The teeth of the tool are by this operation also firmly interlocked with the centrally disposed polygon.

The face of the teeth may now be sharpened and finally lapped, and the tool is ready for use.

Time may be saved in the process of producing this novel tool by certain preparatory steps or refinements that may be easily carried out. For example, the profile or tool ring may be milled or lathed before being attached to the support or carrier ring 2, and then properly hardened, as described before.

Figure 4:
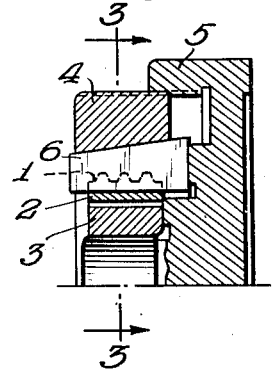

The device shown in Figs. 3 and 4 for effecting the step of pressing the soft carrier ring 2 into interlocking engagement with the polygon, and thus for pitching the teeth at the proper angle, may be constructed differently according to the particular tool which is to be produced, or for any other considerations, so long as the intended object is achieved.

The new method presents the following great advantages:

The time required in carrying out the different operations involved in the production of tools including milling hobs and form cutters is considerably reduced. The time necessary for grinding the profile amounts in the new method to a few minutes as compared to the several hours required in relief grinding formerly necessary.

The surfaces of the flanks of the cutter teeth and therefore also the surfaces of the toothed wheels or profiles produced are considerably smoother than the surfaces of the teeth which can be cut with the best known ground cutters.

The number of teeth of the cutters may be increased approximately by 25%, so that a particularly smooth surface of the flanks of the teeth may be obtained which is above all very important when cutting a small number of teeth.

Also cutters with the smallest module, for instance, 0.1, may be ground. The teeth produced with the aid of these small cutters present a very smooth surface finish, as may be detected by the microscopic method and careful measurements with the gears in operation.

The cost of a cutter manufactured according to the present method is 50% lower than that of a cutter with relief ground flanks. This considerable reduction in cost is due to the saving in expensive high-grade tool steels as well as to the considerably shorter time required in the manufacture of the cutters.

The new method may, of course, be carried out in different ways to meet particular requirements. The cutters thus produced may be employed for all kinds of gearing and profiling work. Spur- and spiral gears and profiles of any shape may be manufactured with such accuracy as to insure a complete interchangeability of the toothed bodies produced. The greater number of teeth of the cutter permits a greater feed as well as higher cutting speeds and therefore an increase in output while at the same time improving the smooth surface finish of the teeth produced. The method, as initially remarked, may also be employed in the manufacture of taps and cutting dies.

Changes may be made in accordance with the scope and spirit of the appended claims.

What is claimed is:

1. The method of manufacturing a cutting tool of the class described, comprising the step of producing a concentric double ring consisting of a steel ring attached to the outside surface of a carrier ring of relatively soft substantially non-hardenable metal, producing the cutting teeth from said steel ring, and radially deforming the carrier ring to determine the angle of said cutting teeth.

2. The method defined in claim 1, together with the step of securing said carrier ring in a centered press-fit peripheral engagement with an inner polygonal member, and the step of deforming the carrier ring radially to effect interlocking engagement with said polygonal member.

3. The method defined in claim 1, together with the step of securing the attachment of said steel ring on said carrier ring by welding or the like, and the step of hardening said steel ring.

4. The method defined in claim 1, wherein said cutting teeth are produced by the step of first grinding a profile on said steel ring, and the step of then cutting axial grooves into said steel ring to produce individual segments, each segment constituting a cutting tooth.

5. The method of manufacturing a cutting tool of the class described, comprising the steps of producing an inner carrier ring of relatively soft substantially non-hardenable metal, producing an outer tool ring of hardenable metal such as tool steel or the like, firmly joining said rings to produce a unitary concentric double ring, producing an inner polygonal mounting member and securing it inside of said inner carrier ring in peripheral centered press-fit engagement therewith, and machining said outer tool ring to form the individual cutting teeth of said tool.

6. The method defined in claim 5, together with the step of subsequently radially deforming said inner carrier ring to effect interlocking engagement thereof with said polygonal member.

7. The method defined in claim 5, together with the step of subsequently deforming said inner carrier ring to effect interlocking engagement thereof with said polygonal member, whereby said teeth formed of said tool ring are radially displaced and disposed at an angle determined by said polygonal member.

8. The method of producing a cutting tool of the class described, comprising providing a carrier member made of relatively soft metal, firmly securing on said carrier member a tool member made of steel or the like, forming cutting teeth on said tool member, and deforming said carrier member to pitch said teeth at an angle.

9. The method defined in claim 8, together with the step of forming a base member carrying a plurality of depressions, and joining said base member with said carrier member, said carrier member being deformed in accordance with the depressions in said base member.

10. In the art of making cutting tools of the class described, the method of forming the cutting teeth, comprising providing a base member having a plurality of depressions, securing on said base member a carrier made of relatively soft metal, firmly attaching to said carrier a tool member made of tool steel or the like, forming teeth on said tool member, and deforming said carrier in accordance with the depressions on said base member.

11. The method of making a cutting tool of the class described comprising the following steps, namely, producing a circular composite element consisting of an outer peripherally disposed shell of hard metal adapted to form cutting teeth and an inner shell of relatively soft substantially non-hardenable metal firmly and substantially permanently and concentrically joined therewith, producing a central peripherally polygonal mounting member and joining it concentrically with said inner shell at the inside thereof in centered press-fit engagement therewith, and subsequently forming cutting teeth on said outer shell.

FRIEDRICH WENZEL.